United States Patent [19]

Hamanaka et al.

[11] 3,852,314

[45] Dec. 3, 1974

[54] SURFACE-ACTIVE ORGANOBORON COMPOUNDS

[75] Inventors: Hiroyoshi Hamanaka, Tokyo; Yasuhisa Okazaki, Ichikawa; Hiroshi Yoshijima, Chiba, all of Japan

[73] Assignee: Toho Chemical Industry Co., Ltd., Tokyo, Japan

[22] Filed: Nov. 30, 1971

[21] Appl. No.: 203,464

[30] Foreign Application Priority Data
Dec. 3, 1970 Japan............................ 45-106282

[52] U.S. Cl............ 260/410.7, 252/356, 260/45.85, 260/89.5 A, 260/345.8, 260/410.6, 260/486 R, 260/92.8 R, 424/219
[51] Int. Cl... C07d 107/02, C08k 1/60, B01f 17/34
[58] Field of Search........... 260/410.6, 410.7, 345.8, 260/462

[56] References Cited
UNITED STATES PATENTS
3,373,170  3/1968  Jones............................... 260/345.8

*Primary Examiner*—Elbert L. Roberts
*Assistant Examiner*—Diana G. Rivers
*Attorney, Agent, or Firm*—Joseph F. Brisbois

[57] ABSTRACT

Organoboron compound having a structure exhibiting a hydrophilic group skeleton including a semipolar bond under normal conditions and a complex ion group skeleton in a basic medium or solution; the process for production of this compound; and its applications as an emulsifier and anti-static agent for plastics and as a heat stabilizer for plastics.

17 Claims, No Drawings

SURFACE-ACTIVE ORGANOBORON COMPOUNDS

SUMMARY OF THE INVENTION

The present invention relates to a new surface active organoboron compound, a process for its production, and applications of said compound. More specifically, it relates to a new surface-active organoboron compound having in its molecules at least one bond of the following type:

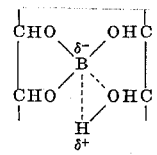

connecting a carboxylic acid ester radical and a polyoxyethylene radical, which can be expressed by the following general formula:

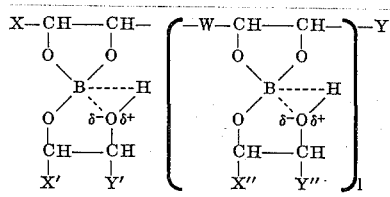

but when $l=0$ and all of X, X', Y, Y' are monovalent radicals, this formula will become as follows:

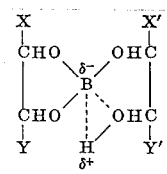

where X, X', Y, Y' are

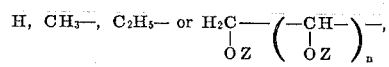

in which:
$n = 0,1,2,$ or 3;
Z is H or $H-(OCH_2CH_2-)_j-$ or $RCO-(OCH_2CH_2-)_k-$ (R is an alkyl having 7 to 31 carbon atoms; and
$0 < \bar{k}+\bar{j} \leq 40$) which definition applies to Z whenever hereinafter used in this specification, unless another definition is specifically indicated.
and least one of X, X', Y, Y' is

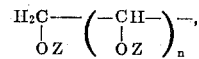

which group contains at least one -OZ radical, where Z is $RCO-(OCH_2CH_2-)_k-$; but when $l=0$, X, Y are monovalent radicals and X', Y'' are divalent radicals, connected by an —X'—Y'—forming—M—radical, this formula will become:

(II)

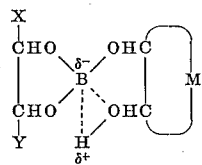

where X, Y are H, $CH_3-$ or $C_2H_5$ or

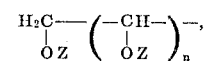

in which $n = 0,1,2$ or 3;
M is

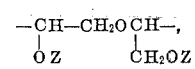

in which Z is as above defined;
or

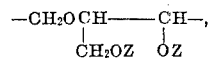

in which Z is as above defined;
and at least one of X, Y, M is an

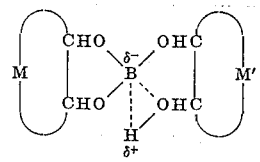

which contains at least one -OZ radical, where Z is $RCO-(OCH_2-CH_2-)_k-$; but when $l=0$ and all of X, X', Y, Y' are divalent radicals, with linkages —X—Y—, —X'—Y'— forming —M— and —M'— radicals, this formula will become:

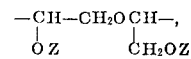

where M, M' are

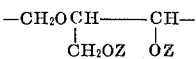

radicals, in which Z is as hereinbefore defined. or

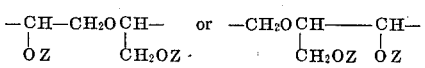

radicals, in which Z is as hereinbefore defined, and at least one of M, M' is

—CH—CH₂OCH—  or  —CH₂OCH——CH—
 |      |              |       |
 OZ    CH₂OZ          CH₂OZ    OZ which contains at least one -OZ radical, where Z is $RCO-(OCH_2CH_2-)_k-$; but when $l=1$; X, X', Y, Y'' are monovalent radicals and X=, Y' are divalent radicals, with a linkage of —Y'—X''— forming —W'— radical this formula will become:

(IV) 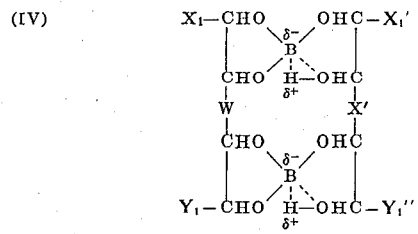

where W, W' are

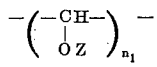

radicals, in which $n_1 = 0, 1$ or 2, and Z is as hereinbefore defined.
$X_1, X_1', Y_1, Y_1''$ are H or

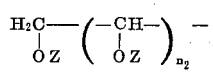

radicals, in which $n_2 = 0$ or 1, and Z is as hereinbefore defined; and at least one of W, W', $X_1, X_1', Y_1, Y_1''$ is

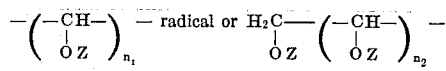

at least one —OZ radical, where Z is $RCO—(OCH_2CH_2—)_k—$; but when $l = 1$ and all of X, X', X'', Y, Y', Y'' are monovalent radicals, this formula will become:

(V) 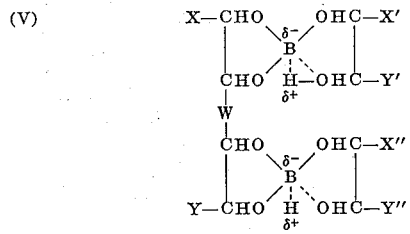

where W is

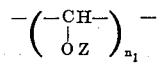

in which $n_1 = 0, 1$ or 2 and Z is as hereinbefore defined;
X, Y are H or

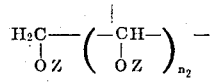

in which $n_2 = 0$, or 1, and Z is as hereinbefore defined;
X', X'', Y', Y'' are H, $CH_3$—, $C_2H_5$— or

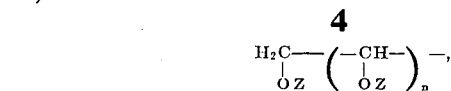

in which $n = 0, 1, 2$ or 3 and Z is as hereinbefore defined; and at least one of W, X, X', X'', Y, Y', Y'' is

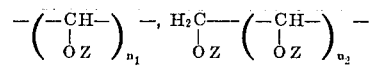

or

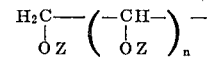

which contains at least one —OZ radical, where Z is $RCO—(OCH_2CH_2—)_k—$; but when $l = 1$, X, X', Y, Y' are monovalent radicals and X'', Y'' are divalent radicals, with a linkage of —X''—Y''— forming —M— radical, this formula will become:

(VI) 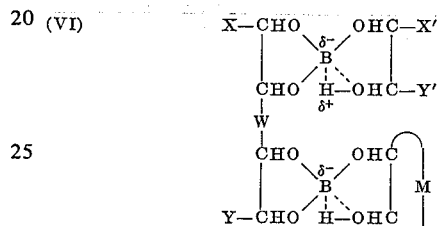

where W is

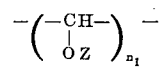

radical, in which $n_1 = 0, 1$ or 2; and Z is as hereinbefore defined;
X, Y are H or

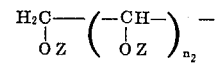

radicals, in which $n_2 = 0$ or 1; and Z is as hereinbefore defined;
X', Y' are H, $CH_3$—, $C_2H_5$—or

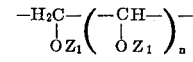

radicals, in which $n = 0, 1, 2$ or 3; and $Z_1$ is as hereinbefore defined;
M is

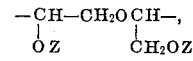

in which Z is as hereinbefore defined;

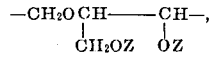

radical, in which Z is as hereinbefore defined; and at least one of W, X, X', Y, Y', M is

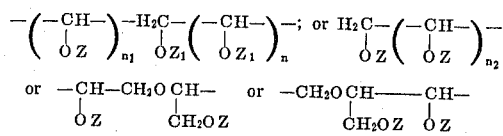

which contains at least one —OZ radical, where Z is RCO — $(OCH_2CH_2—)_k—$; but when $l= 1$; X, Y are monovalent radicals and X', X'', Y', Y'' are divalent radicals, with linkages of —X'—Y'—, —X''—Y''— forming —M—radical and —M'— radical, this formula will become:

(VII) 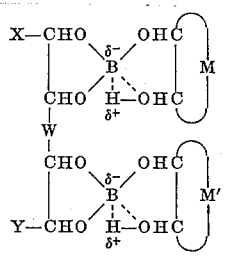

where W is

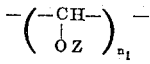

in which $n_1 = 0$, 1 or 2; and Z is as hereinbefore defined;

X, Y are H or

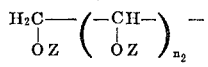

in which $n_2 = 0$ or 1 and Z is as hereinbefore defined; M, M' are $$-CH-CH_2OCH-,$$
$$\;\;\;|\qquad\qquad|$$
$$\;\;OZ\qquad\;CH_2OZ$$

in which Z is as hereinbefore defined;

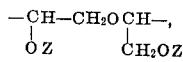

radicals, in which Z is as hereinbefore defined; and at least of W, X, Y, M, M' is

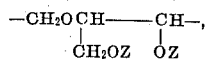

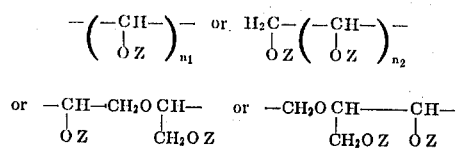

which contains at least one —OZ radical, where Z is RCO—$(OCH_2CH_2—)_k—$.

This new organoboron compound is obtained by first reacting one mol of boric acid or a triester borate of a monohydric lower alcohol with from one to two mols of at least one kind of polyhydric alcohol having vicinal hydroxyl radicals (hereinafter to be called the specified polyhydric alcohol) in such a manner that the total sum of hydroxyl radicals in the molecule of the specified polyhydric alcohol is 5 or more for each boron atom in the molecule of boric acid or each boron atom in the molecule of the triester borate of a lower alcohol, thereby producing a triester borate of the specified polyhydric alcohol with at least two hydroxyl radicals remaining in the molecule; then adding 1-40 mols of ethylene oxide to one mol of the resulting triester borate of the specified polyhydric alcohol with non-protonic Lewis acid in such a manner that the average degree of polymerization of the polyoxyethylene radical in the molecule of the end product amounts to 1-40; and thereafter reacting said triester borate of the specified polyhydric alcohol with a carboxylic acid having alkyl radicals with 7 to 31 carbon atoms (hereinafter to be called the specified carboxylic acid) or a lower alcohol ester of the specified carboxylic acid, or an acylhalide of the specified carboxylic acid, with the alcohol group having, in either case, at least one derived terminal hydroxylic radical.

The surface-active orgaonboron compound of this invention excels as a hydrophilic surface-active agent and is useful as an emulsifier or dispersing agent for various materials; as an anti-static agent for synthetic resins and as an anti-fogging agent. In terms of basic properties such as surface tension decreasing ability and wetting power, the invented compound surpasses the conventional ester type surface-active agents, i.e., polyoxyethylene sorbitan fatty esters (Tween type) or fatty acid esters of polyethyleneglycol. Moreover the heat stability of the compound itself is far better.

In describing the present invention, a particularly detailed account of the starting materials and the reacting conditions will be given.

First, suitable polyhydric alcohols having vicinal hydroxylic radicals to be reacted with boric acid or a triester borate of a lower alcohol to produce a triester borate of polyhydric alcohol which is to constitute a hydrophilic group skeleton, include the following substances: ethyleneglycol, propyleneglycol, butyleneglycol, glycerine, sorbitan, sorbitol, manitol, etc. Meanwhile, suitable triester borates of a lower alcohol include: trimethyl borate, triethyl borate, tripropyl borate, triisopropyl borate, tributyl borate, etc. Here, the esterification reaction using boric acid and a polyhydric alcohol can be easily promoted by heating and dehydrating under reduced or normal pressure at 70-300°C, or preferably at 180°-210°C, while the ester interchange reaction using a triester borate of lower alcohol and a polyhydric alcohol can be easily promoted by removing the side product, i.e., lower alcohol under reduced or normal pressure at 50°-250°C or preferably at 100°-180°C. In this case the restrictive conditions for charging the materials and assuring the above-mentioned structural dislocation of the resulting hydrophilic group skeleton are that two mols of at least one kind of polyhydric alcohols be used per mol of boric acid or a triester borate of lower alcohol; and that the proportions of charged materials be so selected that the total number of hydroxylic radicals, including those which become polyoxyethylene radicals in the next stage of production is 5 or more per boron atom. For this reason, the dihydric alcohols such as ethyleneglycol, propyleneglycol cannot be used alone; they must be combined in use with a more than dihydric alcohol.

In this reaction, usually no esterification catalyst is needed; an inert gas such as nitrogen or carbon dioxide gas is introduced for the purpose of facilitating completion of the reaction. Azeotropic dehydration may be carried out by means of a solvent such as xylene, toluene in esterification.

Next, a comment is made on the addition of ethylene oxide for the purpose of further increasing the hydrophilic property of the resulting hydrophilic group skeleton. The Lewis acid catalysts available for this purpose include: boron trifluoride ethyletherate $BF_3.O(C_2H_5)_2$, tin chloride (IV) $SnCl_4$, antimony chloride (V) $SbCl_5$, titanium chloride (IV) $TiCl_4$, iron chloride (III) $FeCl_3$, zinc chloride (IV) $ZnCl_4$, phosphorus pentoxide $P_2O_5$, aluminium chloride (III) $AlCl_3$, etc.; 0.001–5% or preferably 0.3–1% of such catalysts should be used for the triester borate of the specified polyhydric alcohol obtained in the preceding stage and then the reaction will proceed with the reaction temperature 50°–250°C, or preferably 70°–150°C, and a reaction pressure of atmospheric pressure to 20 $Kg/cm^2$, or preferably 1–5 $Kg/cm^2$.

The necessary condition which makes it possible for the surface-active organoboron compound of this invention obtained through the next carboxylic acid esterification reaction to exhibit excellent performance as a surface active agent is that in this stage an ethylene oxide adduct of 1–40 in average degree of polymerization be produced.

The present inventors tried to synthesize a propylene oxide adduct in this stage and derive therefrom a surface-active organoboron compound in the same manner as this invention, but the product thus obtained turned out to be inferior to the product derived from the ethylene oxide adduct. On the other hand, we investigated similar products containing a mixed chain of ethylene oxide and propylene oxide, but in this case too the results of testing them provied unimpressive.

Next, turning to the problem of carboxylic acid esterification for deriving the end product of this invention, i.e., the surface-active organoboron compound, the carboxylic acids suitable as the surface-active agent are carboxylic acids containing saturated or unsaturated alkyl radicals having 7 to 31 carbon atoms or halogentated or hydroxylated alkyl radicals. More specifically, the following natural or synthetic substances can be mentioned: caprylic acid, lauric acid, palmitic acid, stearic acid, branched stearic acid, hydroxystearic acid, linoleic acid, ricinoleic acid, α— bromopalmitic acid, α— chlorostearic acid, oleic acid, behenic acid, lignoceric acid, cerotic acid. Now, the direct esterification between these carboxylic acids and the product obtained in the preceding stage can be easily promoted by heating and dehydration under reduced or normal pressure at 70° – 250°C or preferably at 180° – 230°c. Turning now to the ester interchange reaction with use of methylalcohol ester: a methyl alcohol ester of the above-mentioned carboxylic acids can be made easily under reduced or normal pressure at 50°–200°C or preferably at 80°–150°C.

On the other hand, in the esterification by dehydrohalogenation with use of an acyl halide of carboxylic acid, a carboxylic acid ester can be easily produced under reduced or normal pressure at 30°–150°C or preferably at 60°–80°C. Moreover, this carboxylic acid esterification is characterized by the reaction completing itself without using any special esterification catalyst such as an alkali, alkaline metal or acid, no matter what method is adopted. Of course, the said carboxylic acid estrification is also completed with the use of such catalysts. Also in this reaction, the smooth progress of reaction will be facilitated by the introduction of an inert gas such as nitrogen or carbon dioxide gas or by the use of an azeotropic solvent or a dilution solvent for the purpose of dehydration.

By tracking the structure in the compound thus obtained through IR spectral analysis and NMR spectral analysis, the present inventors have been able to confirm that this organoboron compound, just like the organoboron compound covered by U.S. Pat. application Ser. No. 882,342, filed Dec. 4, 1969, now U.S. Pat. No. 3,772,357, is characterized by a structural dislocation depending on the ambient atmosphere. Specifically, under normal conditions this compound possesses a hydrophilic group skeleton including a semi-polar bond as follows:

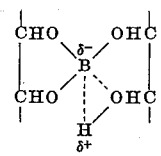

In a basic medium or solution however, this structure is transformed to that of a complex ion group as follows:

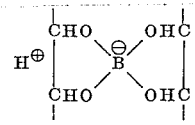

This structural dislocation exhibited by the invented compound is an action resulting from the excessive OH radicals in the end product existing in the range of being able to form a coodinate bond with boron atoms of triborate structure according to the selection of above-mentioned appropriate proportions of charged materials with a polyhydric alcohol having vicinal hydroxylic radicals as the starting material.

To cite a relevant example of structural analysis, the following observations are made in the IR spectral analysis of the organoboron compound according to this invention: Whereas in normal condition the characteristic absorption band supposed to be due to

(out-of-plane deformation vibration of QH) is conspicuous at 830 $cm^{-1}$, the structure of this compound is completely changed to an ion structure when this compound is neutralized with alkali in a nucleo-philic field and the above-mentioned characteristic absorption band appearing at 830 cm$^{-1}$ vanishes. This is proof of the above-mentioned structural dislocation. With the known triester borates, the above-mentioned absorption band is not recognized.

As the known organoboron compounds containing polyoxyethylene radicals may be mentioned many substances with a boric acid ester as the terminal hydroxylic radical in an alcohol-ethylene oxide adduct having the general formula $(R'[O-(CH_2)_x]_y-O)_3B$ as illustrated by British Pat. Specification No. 1214171. In addition, the Japanese Pat. Publication Sho. 42-24043 and U.S. Pat. No. 3,373,170 disclose a structure of surface-active agent with a boric acid ester in place of polyoxyethylene sorbitan monoalkylate.

The surface-active organoboron compound of this invention is remarkable not only in that it is structurally different from the compounds mentioned above, but also in that it is produced by a new, unique process. To go into details about this, according to this invention in the first stage of production the boric acid triesterification of a polyhydric alcohol having vicinal hydroxylic radicals takes place under the above-mentioned materials charging conditions to produce a compound in whose molecules coexist

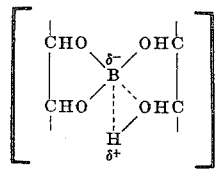

radicals and excessive OH radicals

In the second stage, the ethylene oxide addition takes place using a Lewis acid catalyst and as a result the addition of ethylene oxide is made only in the remaining portion of the excessive OH radicals without causing any change in the OH radicals forming a semi-polar bond in the above-mentioned

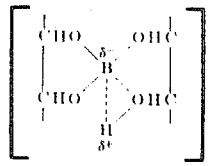

radicals

In connection with this addition reaction, the present inventors have discovered a valuable fact in that the addition of ethylene oxide does not cease at the extent of several mols as happens with the ordinary reaction under use of an acidic catalyst, but can produce a high-mol addition polymer.

Further they have discovered the singular fact that the ethylene oxide addition reaction will take place only in the presence of a Lewis acid catalyst and this is recognized as a remarkably different reaction from the ethylene oxide addition to the alcoholic OH radicals in conventional processes for the production of surface-active agents. Specifically, the experimental results show that the addition reaction of this invention will not take place at all when a conventional alkali catalyst, alkaline metal catalyst, or alcoholate catalyst is used. And even with no use of any catalyst, or with the use of a proton acid catalyst no addition of ethylene oxide will occur.

The following are investigative data on the weight increase of the formed product and the volume of by-products when 88g(2.0 mol) of ethylene oxide was added at a flow rate of 0.5 l/min under normal pressure to 19.2 g(0.1 mol) of bis-(glyceryl-α,β-) boronium hydride, i.e., one of the intermediate products in this invention in presence of different catalysts.

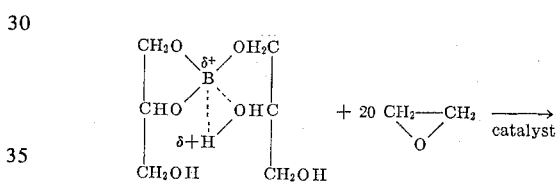

Addition of ethylene oxide to bis(glyceryl)-α,β- boronium hydride in presence of different catalyst

| Catalyst | Materials charged | Ratio of catalyst to materials | Reaction temperature | Volume of introduced ethylene oxide | Weight Increased | Volume of by-product |
|---|---|---|---|---|---|---|
| No catalyst | 19.2 g | — | 140°C | 88g | —(0%) | —(0%) |
| KOH | do. | 0.2% | 140 | do. | (0%) | —(0%) |
| Na(Metal) | do. | 0.1 | 130 | do. | (0%) | —(0%) |
| NaO CH$_3$ | do. | 0.2 | 140 | do. | (0%) | trace |
| BF$_3$·O(O$_2$H$_5$)$_2$ | do. | 0.2 | 110 | do. | 70g(79.5%) | 3.5g(4.0%) |
| do. | do. | 0.2 | 130 | do. | 80g(91.0%) | 4.7g(5.3%) |
| S$_n$Cl$_4$ | do. | 0.3 | 80 | do. | 65g(73.9%) | 1.5g(1.7%) |
| S$_b$Cl$_5$ | do. | 0.5 | 80 | do. | 58g(66.0%) | 1.5g(1.7%) |
| H$_2$SO$_4$ | do. | 0.3 | 110 | do. | —(0%) | trace |
| HNO$_3$ | do. | 0.2 | 130 | do. | —(0%) | trace |

Meanwhile, the present inventors have been able to confirm the fact that the product of the second stage of the process, as obtained by ethylene oxide addition in the presence of Lewis acid catalyst, according to this invention retains in its molecules

radicals, through a potentiometric titration conducted using a methanol caustic potash in a solvent of methanol-acetone (1:1), whereby the product of the second stage was neutralized with the consumption of the 1g equivalent of caustic potash as calculated from the structural formula.

Next, turning to the carboxylic acid esterificatioin with some of the OH radicals, to be carried in the third stage for the purpose of introducing hydrophobic radicals, similarly the retention of

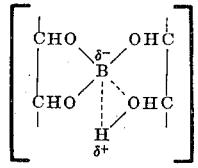

radicals has been verified through a potentiometric titration conducted under the same conditions as above, whereby approximately 1g equivalent of KOH was also consumed. Thus it has been revealed that carboxylic acids react selectively with the terminal hydroxylic radicals in polyoxyethylene radicals.

The following are specific examples illustrating the process of the present invention.

Example 1

61.8 g (1 mol) of boric acid and 184.2 (2 moles) of glycerine were charged into a four necked flask equipped with a stirrer, a thermometer, a gas-introducting pipe, and a water measuring tube connected to a reflux condenser. Then, with nitrogen gas introduced, dehydration was carried out at 180°–210°C, taking 4 hours. As a result, with 54 g of water removed, a triester borate was obtained as a clear liquid. This liquid was subjected to neutralization titration with alcoholic caustic potash in a mixed 50:50 alcohol-ether solvent and its acid value was found to be 288 (theoretically 292). Then this liquid was poured into a pressure autoclave, into which 0.95 g (0.5% based on starting material) or boron trifluoride etherate (35% ethylether solution) was added as a catalyst. Thereupon, under a pressure of 3–4 kg/cm² and at 130°C, 440 g (10 mols) of ethylene oxide was added thereto, taking 2 hours; and as the result, a clear yellowish liquid was produced.

The total volume of the ethylene oxide adduct thus obtained was returned to the above-mentioned four necked distillation flask, to which 144.1 g (1 mol) of caprylic acid was added; and thereafter under introduction of nitrogen gas, dehydration was carried out at 180°–200°C, taking 5 hours. After removal of 18 g water, a reddish brown oily substance resulted. Neutralization titration of this reaction product showed its acid value to be 68 (theoretically 74). When the IR absorption spectrum of this product showed that the C=O stretching vibration (1,710cm⁻¹) due to the free carboxylic acid abated and only the C=O stretching vibration (1,740cm⁻¹) corresponding to perfect conversion to ester linkage remained, the reaction was judged to have been completed.

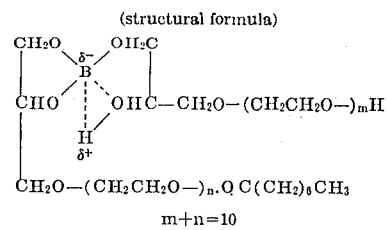

(structural formula)

$m+n=10$

| Emission spectrum | | |
|---|---|---|
| 2496.8A | 2497.7A | (B) |
| IR absorption spectrum | | |
| 1740cm⁻¹ | ($\nu$C=O) | |
| 1400–148 cm⁻¹ | ($\nu$B—O) | |
| 835cm⁻¹ | ($\delta$B...H—O) | |
| B | % | |
| (measured) | (theoretical) | |
| 1.40 % | 1.43 % | |

Example 2.

145.8 g (1 mol) of triethyl borate, 92.1 g (1 mol) of glycerine and 62.1 g (1 mol) of ethylene glycol were charged into the same apparatus as employed in Example 1. In a nitrogen gas stream, deethanolization was carried out at 120°–130°C, taking about 5 hours and this process yielded a clear liquid substance with an acid value of 340.5. After 1.5 g (about 1% based on starting material) of titanium tetrachloride was added thereto, 704 g (16 mols) of ethylene oxide was introduced at 90°C, taking 5 hours, under a rather mild passage of nitrogen gas; after 30 minutes of aging thereafter, a yellowish liquid product was obtained. Then 214 g (1 mol) of methyl laurate was added to this reaction product and after about 5 hours of demethanolization at 160°–180°C, a yellowish oily substance with an acid value of 48 (theoretically 52) was produced.

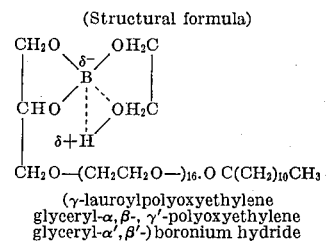

(Structural formula)

(γ-lauroylpolyoxyethylene glyceryl-α,β-, γ'-polyoxyethylene glyceryl-α',β'-)boronium hydride

| Emission spectrum | | |
|---|---|---|
| 2496.8A | 2497.7A | (B) |
| IR absorption spectrum | | |
| 1735cm⁻¹ | ($\nu$C=O) | |
| 1400cm⁻¹–1480-cm⁻¹ | ($\nu$B—O) | |
| 830cm⁻¹ | ($\delta$B...H—O | |
| B | % | |
| (measured) | (theoretical) | |
| 0.98% | 1.01% | |

Example 3.

187.8 g (1 mol) of triisopropyl borate, 92.1 g (1 mol) of glycerine and 76.1 g (1 mol) of propylene glycol were charged into the same apparatus as employed in Example 1. During the introduction of nitrogen gas, an ester interchange reaction was carried out at 100°–120°C, taking 6 hours. After removal of nearly the specified amount of isopropyl alcohol, a yellowish liquid substance was produced. 0.5 g (about 0.3% based on starting material) of zinc (IV) chloride was added to this liquid and thereafter, 880 g (20 mols) of ethylene oxide was introduced at 120°C. It took about 6 hours to complete the addition reaction, which yielded a yellowish liquid substance.

Next, after 5 hours of reaction at 140°C with 256 g (1 mol) of palmitic acid and 200 g of xylene as an azeotropic solvent, 18 g of water was removed. Under reduced pressure, the xylene was distilled off, leaving a yellowish paste with an acid value of 38.

(structural formula)

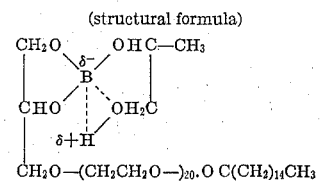

$CH_2O-(CH_2CH_2O-)_{20}.OC(CH_2)_{14}CH_3$

| Emission spectrum | | |
|---|---|---|
| 2496.8A | 2497.7A | (B) |
| IR absorption spectrum | | |
| 1735cm$^{-1}$ | ($\nu$C=O) | |
| 1400–1480cm$^{-1}$ | ($\nu$B—O) | |
| B | % | |
| (measured) | (theoretical) | |
| 0.79% | 0.84% | |

Example 4.

618 g (10 mols) of boric acid and 1,842 g (20 mols) of glycerine were charged into the same appartatus as employed in Example 1. During the introduction of nitrogen gas, dehydration was carried out at 200°–210°C, taking 6 hours. Removal of 535 g of water left a clear triester borate liquid with an acid value of 290 (theoretically 292). The total volume of this liquid was introduced into a pressure autoclave, into which 60 g (about 3% based on starting material) of boron trifIfuoride etherate (35% ethyl ether solution) was added as a catalyst. Then under a pressure of 5 kg/cm² at 130°C, 10560 g(240 mols) of ethylene oxide was introduced, taking about 10 hours and as the result a yellowish clear liquid with an acid value of 43 (theoretically 45.1) was produced. Next, 1,248 g (1 mol) of this ethylene oxide adduct was introduced into a four-necked distillation flask equipped with a stirrer, a thermometer, a dropping funnel and an adapter. After the addition of monochlorobenzene 500 g as a dilution solvent, 302.5 g (1 mol) of stearoyl chloride was introduced at 70°C through the dropping funnel, taking about 2 hours. Then, with a gas-introducing pipe provided, hydrochloric acid was removed by introducing a stream of nitrogen gas having a rising temperature, taking 5 hours.

Then, with the adapter replaced by a measuring pipe, monochlorobenzene was distilled away at 180°–200°C, taking 2 hours, and a yellowish wax-like substance was produced. Measurement showed the acid value of this substance to be 34 (theoretically 37).

(Structural formula)

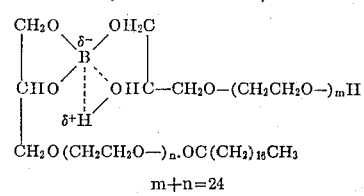

$CH_2O(CH_2CH_2O-)_n.OC(CH_2)_{16}CH_3$ m+n=24

($\gamma$-stearoylpolyoxyethylene glyceryl-$\alpha,\beta$-, $\gamma'$-polyoxyethylene glyceryl-$\alpha',\beta'$-)boronium hydride

| Emission spectrum | | |
|---|---|---|
| 2496.8A | 2497.7A | (B) |
| IR absorption spectrum | | |
| 1735cm$^{-1}$ | (C=O) | |
| 1400–1480cm$^{-1}$ | (B—O) | |
| B | % | |
| (measured) | (theoretical) | |
| 0.69% | 0.71% | |

Example 5.

1,248 g (1 mol) of triester borate containing polyoxyethylene radicals, i.e., the intermediate product with an acid value of 43 as obtained in the first and second stages in Example 4, was introduced into a four-necked distillation flask equipped with a stirrer, a thermometer, a gas-introducing pipe and a water measuring tube linked to a reflux condenser. 284 g (1 mol) of branched stearic acid suitable for industrial use was added thereto. Then, in a nitrogen gas stream at 200°–230°C, 18 g of water was removed, taking 5 hours, a yellow clear oily substance with an acid value of 32 was produced. (Structual formula)

(Structural formula)

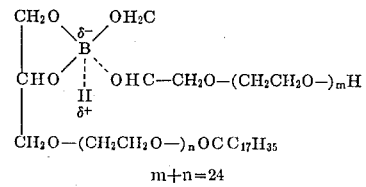

$CH_2O-(CH_2CH_2O-)_n OC C_{17}H_{35}$ m+n=24

Emission spectrum

| 2496.8A | 2497.7A | (B) |
|---|---|---|

IR absorption spectrum

| 1740 cm$^{-1}$ | ($\nu$C=O) |
|---|---|
| 1400–1480 cm$^{-1}$ | ($\nu$B—O) |

| B | % | |
|---|---|---|
| (measured) | (theoretical) | |
| 0.68 % | 0.71% | |

Example 6

1,248 g (1 mol) of triester borate containing polyoxyethylene radicals, i.e., the intermediate product in Example 4, and 568 g (2 mols) of branched stearic acid were charged into the same apparatus as used in Example 5. After 7 hours of reaction at 230°–240°C in a nitrogen gas stream, a yellow clear liquid was produced.

(Structural formula)

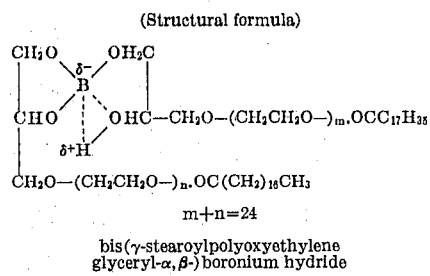

m+n=24 bis($\gamma$-stearoylpolyoxyethylene glyceryl-$\alpha,\beta$-)boronium hydride

Emission spectrum

| 2496.8A | 2497.7A | (B) |
|---|---|---|

IR absorption spectrum

| 1740cm$^{-1}$ | ($\nu$C=O) |
|---|---|
| 1400–1480cm$^{-1}$ | ($\nu$B—O) |

| B | % | |
|---|---|---|
| (measured) | (theoretical) | |
| 0.59% | 0.61% | |

Example 7.

1,248 g (1 mol) of triester borate containing polyoxyethylene radicals, i.e., the intermediate product in Example 4, and 282 g (1 mol) of oleic acid were charged into the same apparatus as used in Example 5. After 6 hours of dehydration at 230°C in a nitrogen gas stream 18g of water was removed and an orange-yellow liquid was produced.

(Structural formula)

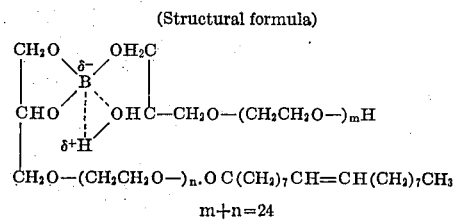

m+n=24

($\gamma$-oleoylpolyoxyethylene glyceryl-$\alpha,\beta$-, $\gamma'$-polyoxyethylene glyceryl-$\alpha',\beta'$-)boronium hydride Emission spectrum

| 2496.8A | 2497.7A | (B) |
|---|---|---|

IR absorption spectrum

| 1745cm$^{-1}$ | ($\nu$C=O) |
|---|---|
| 1400–1480cm$^{-1}$ | ($\nu$B—O) |

| B | % | |
|---|---|---|
| (measured) | (theoretical) | |
| 0.69% | 0.71% | |

Example 8.

2,496 g (2 mols) of triester borate containing polyoxyethylene radicals, i.e., the intermediate product in Example 4, and 846 g (3 mols) of oleic acid were charged into the same apparatus used in Example 5. Taking 6 hours in a nitrogen gas stream at 240°C, the specified extent of dehydration was nearly attained, leaving an orange-yellow liquid.

(Structural formula) a mixture of

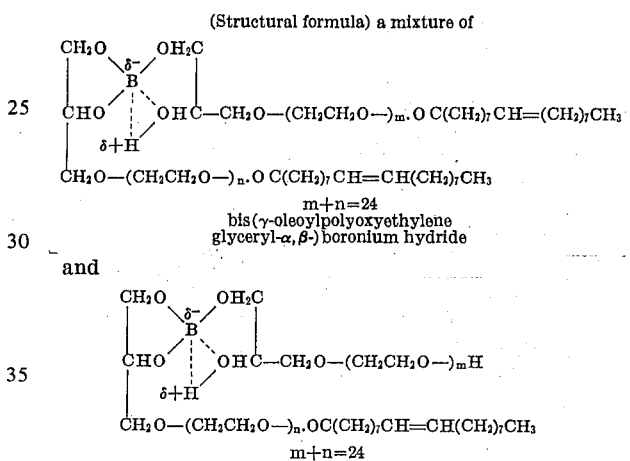

and

Emission spectrum

| 2496.8A | 2497.7A | (B) |
|---|---|---|

IR absorption spectrum

| 1745cm$^{-1}$ | ($\nu$C=O) |
|---|---|
| 1400–1480cm$^{-1}$ | ($\nu$B—O) |

| B | % | |
|---|---|---|
| (measured) | (theoretical) | |
| 0.62% | 0.68% | |

Example 9.

1,248 g (1 mol) of triester borate having polyoxyethylene radicals, i.e., the intermediate product in Example 4, and 200.3 g (1 mol) of lauric acid were charged into the same apparatus as used in Example 5. Taking 6 hours in a nitrogen gas stream at 210°C, 18 g of water was eliminated, leaving a light yellow liquid.

(structural formula)

CH$_2$O     OH$_2$C
   \ $\delta-$ /
    B
CHO ⁝  OHC—CH$_2$O—(CH$_2$CH$_2$O—)$_m$H
   $\delta+$H CH$_2$O—(CH$_2$CH$_2$O—)$_n$.O C(CH$_2$)$_{10}$CH$_3$ m+n=24

| Emission spectrum | | |
|---|---|---|
| 2496.8A | 2497.7A | (B) |

| IR absorption spectrum |
|---|
| 1735cm$^{-1}$ ($\nu$C=O) |
| 1400–1480cm$^{-1}$ ($\nu$B—O) |

| B % | |
|---|---|
| (measured) | (theoretical) |
| 0.75% | 0.76% |

Example 10.

1,248 g (1 mol) of triester borate containing polyoxyethylene radicals, i.e., the intermediate product in Example 4, and 400.6 g (2 mols) of lauric acid were charged into the same apparatus as used in Example 5. Taking 6 hours in a nitrogen gas stream at 220°C, 36 g of water was eliminated, yielding an orange-yellow liquid.

(structural formula)

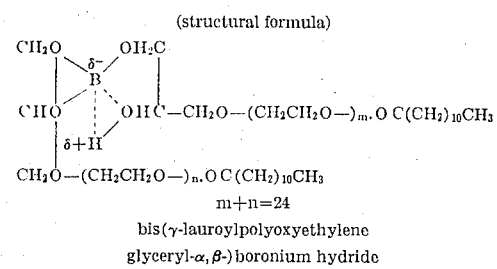

m+n=24 bis($\gamma$-lauroylpolyoxyethylene
glyceryl-$\alpha,\beta$-)boronium hydride

| Emission spectrum | | |
|---|---|---|
| 2496.8A | 2497.7A | (B) |

| IR absorption spectrum |
|---|
| 1735cm$^{-1}$ ($\nu$C=O) |
| 1400–1480cm$^{-1}$ ($\nu$B—O) |

| B % | |
|---|---|
| (measured) | (theoretical) |
| 0.63% | 0.67% |

Example 11.

1,248 g (1 mol) of triester borate containing polyoxyethylene radicals, i.e., the intermediate product in Example 4, and 56.0 g (2 mols) of linoleic acid were introduced into the same apparatus as used in Example 5. Spending about 8 hours in a nitrogen gas stream at 200°–220°C, 35.5 g of water was removed, yielding a yellow-brown oily substance.

(structural formula)

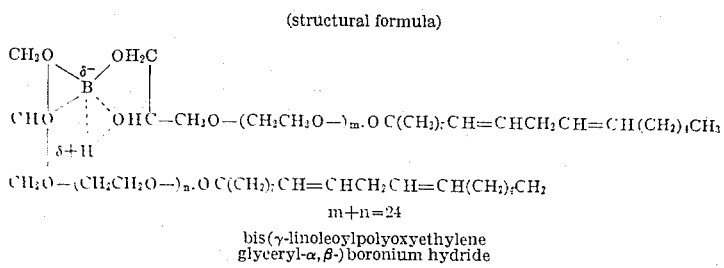

m+n=24 bis($\gamma$-linoleoylpolyoxyethylene
glyceryl-$\alpha,\beta$-)boronium hydride

Example 12

1248 g (1 mol) of triester borate containing polyoxyethylene radicals, i.e., the intermediate product in Example 4, was introduced into a four necked distillation flask equipped with a stirrer, a thermometer, a dropping funnel and an adapter, and at 70°C 274.5 g (1 mol) of palmitoyl chloride was dropped therein, taking about 2 hours. Then with the dropping funnel replaced by a gas-introducing pipe, taking about 3 hours in a nitrogen gas stream at 120°C, hydrochloric acid was removed, and as the result a light yellow pasty substance was produced.

(structural formula)

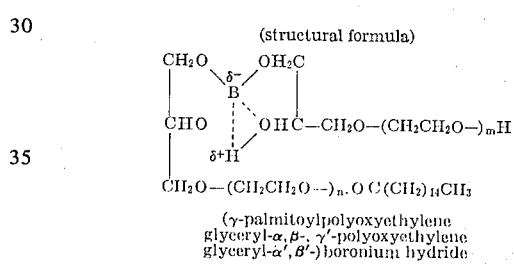

($\gamma$-palmitoylpolyoxyethylene
glyceryl-$\alpha,\beta$-, $\gamma'$-polyoxyethylene
glyceryl-$\alpha',\beta'$-)boronium hydride

| Emission spectrum | | |
|---|---|---|
| 2496.8A | 2497.7A | (B) |

| IR absorption spectrum |
|---|
| 1735cm$^{-1}$ ($\nu$C=O) |
| 1400–1480cm$^{-1}$ ($\nu$B—O) |

| B % | |
|---|---|
| (measured) | (theoretical) |
| 0.69% | 0.73% |

Example 13

164 g (1 mol) of crystalline sorbitan, 92.1 g (1 mol) of glycerine and 164.8g (corresponding to 1 mol) of a 63% methanolic solution of trimethyl borate were introduced into a four-neck distillation flask equipped with a stirrer, a thermometer and a vacuum apparatus, and at 75°–80°C, and 5–10mmHg, demethanolization was carried out for 6 hours to distill 155 g of methanol. 0.25 g (about 0.11% based on starting material) of stannyl(IV)chloride was added to the light yellow viscous substance thus produced, and after the temperature rose to 200°C, 880 g (20 mols) of ethylene oxide was slowly introduced under normal pressure, taking about 10 hours, and this was followed by one hour of aging. The result was a light yellow liquid with an acid value of 45.

Then, with the vacuum apparatus refitted, 298 g (1 mol) of methyl 12-hydroxystearate was added, and at 120°–130°C, 5–10mmHg. about 30 g of methanol was distilled away, taking 3 hours, yielding a brownish waxlike substance.

was added. Then, with the temperature raised to 240°C, 35 g of water was removed over a period of about 8 hours, yielding a light yellow paste.

(Structural formula)

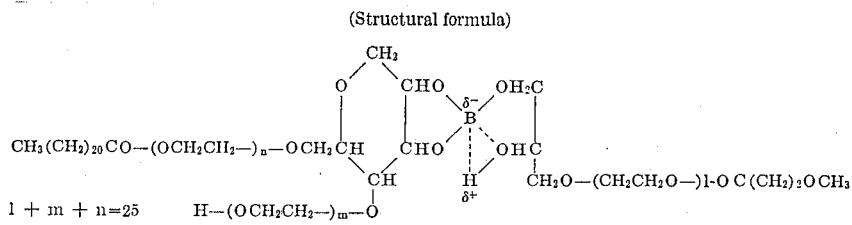

| Emission spectrum | | |
|---|---|---|
| 2496.8A | 2497.7A | (B) |

| IR absorption spectrum | |
|---|---|
| 1735cm$^{-1}$ | ($\nu$C=O) |
| 1400–1480cm$^{-1}$ | ($\nu$B—O) |

| B | % |
|---|---|
| (measured) | (theoretical) |
| 0.50% | 0.54% |

Example 15

Using the same equipment as used in Example 1, 260 g (corresponding to 1 mol) of a 70% aqueous solution (structural formula)

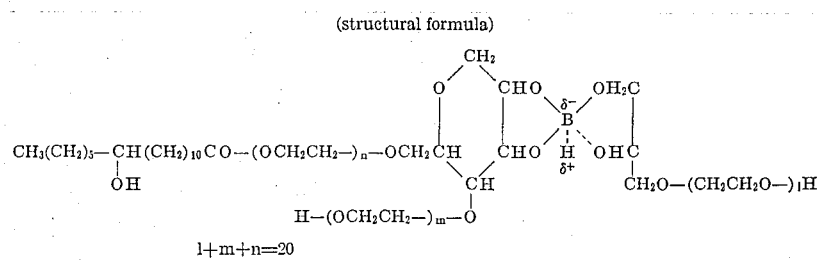

| Emission spectrum | | |
|---|---|---|
| 2496.8A | 2497.7A | (B) |

| IR absorption spectrum | |
|---|---|
| 1740cm$^{-1}$ | ($\nu$C=O) |
| 1400–1480cm$^{-1}$ | ($\nu$B—C) |

| B | % |
|---|---|
| (measured) | (theoretical) |
| 0.68% | 0.76% |

Example 14.

Using the same equipment as used in Example 1, 164 g (1 mol) of manitan powder, 92.1 g (1 mol) of glycerine and 229.8 g (1 mol) of tributyl borate were mixed together. Debutanolization for ester interchange was carried out for 6 hours in a nitrogen gas stream at 200°C, thereby yielding a colorless clear viscous substance having an acid value of 206 (theoretically 212).

This substance was placed in a pressure autoclave; and using 0.5 g (0.2% based on starting material) of aluminum (III) chloride as a catalyst, under a pressure 6–8 kg/cm$^2$ and at a temperature of 180°–200°C, 1100 g (25 mols) of ethylene oxide was reacted therewith taking about 4 hours, and yielding a yellow clear liquid.

1,360 g (1 mol) of the resulting ethylene oxide adduct was again introduced into the four-necked distillation flask, to which 681.2 g (2 mols) of behenic acid of sorbitol, 180 g (2 mols) of 1,2-butylene glycol and 123.7 g (2 mols) of boric acid were mixed together.

During the introduction of nitrogen gas the temperature was raised to 210°C, over about 6 hours, and 185 g of water was thereby removed, leaving a slightly yellow viscous substance with an acid value of 297. Then 4 g (about 1% based on starting material) of antimony(V)chloride and 1320 g (30 mols) of ethylene oxide were introduced at 150°C, taking about 16 hours, and yielding an orange-yellow oily substance.

Next, 467.5 g (1 mol) of fatty acid (major contents: C$_{28}$ 17.3%, C$_{30}$ 35.1%, C$_{32}$ 32.8%) obtained by the decomposition of rice bran oil was added; and at 240°C, the reaction was continued for 12 hours. After the elimination of 17.5 g of water, a yellowish brown waxlike substance was produced.

(Structural formula)

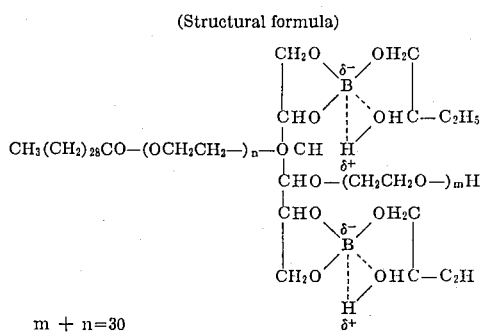

| Emission spectrum | | |
|---|---|---|
| 2496.8A | 2497.7A | (B) |

| IR absorption spectrum | |
|---|---|
| 1735cm$^{-1}$ | ($\nu$C=O) |
| 1400–1480cm$^{-1}$ | ($\nu$B—O) |

| B | % |
|---|---|
| (measured) 0.98% | (theoretical) 1.00% |

Example 16.

Using the same equipment as used in Example 1, 61.8 g (1 mol) of boric acid and 184.2 g (2 mols) of glycerine were mixed together, and during the introduction of nitrogen gas, at 210°C the reaction mixture was dehydrated for 5 hours. The elimination of 54 g of water yielded a colorless clear liquid of triester borate with an acid value of 290.

Next, 6 g (3% based on starting material) of boron trifluoride etherate (35% ethylether solution) was added; and after heating up to 120°C, with the introduction of 1,760 g (40 mols) of ethylene oxide together with nitrogen gas, the addition reaction took 16 hours. This was followed by addition of 568 g (2 mols) of stearic acid and 8 hours of dehydration at 240°C, during which 35.5 g of water was removed. The yield was a yellowish brown paste.

(Structural formula)

$$\begin{array}{c} CH_2O \quad OH_2C \\ | \quad \searrow_{\delta^-}/ \quad | \\ | \quad /B\backslash \quad | \\ CHO \quad OHC—CH_2O—(CH_2CH_2O—)_m·OC(CH_2)_{16}CH_3 \\ | \quad H \quad | \\ \quad \delta^+ \\ CH_2O—(CH_2CH_2O—)_n·OC(CH_2)_{16}CH_3 \\ m+n=40 \end{array}$$

| Emission spectrum | | |
|---|---|---|
| 2496.8A | 2497.7A | (B) |

| IR absorption spectrum | |
|---|---|
| 1735cm$^{-1}$ | ($\nu$C=O) |
| 1400–1480cm$^{-1}$ | ($\nu$B—O) |

| B | % |
|---|---|
| (measured) 0.40% | (theoretical) 0.43% |

Example 17.

Using the same equipment as used in Example 1, 61.8 g (1 mol) of boric acid and 184.2 g (2 mols) of glycerine were mixed together, and dehydrated during the introduction of nitrogen gas at 210°C, taking 5 hours. The elimination of 54 g of water yielded a colorless clear liquid of triester borate having an acid value of 288.

Next, 3 g (1.5% based on starting material) of aluminum chloride was added; and after heating up to 100°C, under normal pressure 88 g (2 mols) of ethylene oxide was slowly added.

Then, 400.6 g (2 mols) of lauric acid was poured in and in 6 hours at 200°C, 36 g of water was eliminated in a nitrogen gas stream, thereby yielding a light yellow paste with an acid value of 84 (theoretically 87) as the reaction product.

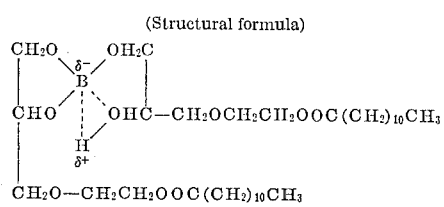
(Structural formula)

| Emission spectrum | | |
|---|---|---|
| 2496.8A | 2497.7A | (B) |

| IR absorption spectrum | |
|---|---|
| 1740cm$^{-1}$ | ($\nu$C=O) |
| 1400–1480cm$^{-1}$ | ($\nu$B—O) |
| 830cm$^{-1}$ | ($\delta$B...H—O) |

| B | % |
|---|---|
| (measured) 1.67% | (theoretical) 1.69% |

Example 18

Using the same equipment as used in Example 1, 145.8 g (1 mol) of triethyl borate, 92.1 g (1 mol) of glycerine and 62.1 g (1 mol) of ethyleneglycol were mixed together, and deethanolized in a nitrogen gas stream at 130°C for about 4 hours, thereby yielding a colorless clear liquid with an acid value of 340.

Next, 1.5 g (about 1% based on starting material) of boron trifluoride etherate (35% ethylether solution) was added; and at 100°C, 220 g (5 mol) of ethylene oxide together with nitrogen gas was introduced, taking about 5 hours. Thirty minutes of aging thereafter completed the addition reaction.

This was followed by the charging of 256 g (1 mol) of palmitic acid; and after heating up to 230°C, 18 g of water was removed as the by-product, taking about 6 hours. Thus a light yellow paste was produced.

(Structural formula)

$$\begin{array}{c} CH_2O \quad OH_2C \\ | \quad \searrow_{\delta^-}/ \quad | \\ | \quad /B\backslash \quad | \\ CHO \quad OH_2C \\ | \quad H \quad \\ \quad \delta^+ \\ CH_2O(CH_2CH_2O—)_5—OC(CH_2)_{14}CH_3 \end{array}$$

| Emission spectrum | | |
|---|---|---|
| 2496.8A | 2497.7A | (B) |

| IR absorption spectrum | |
|---|---|
| 1735 cm$^{-1}$ | (C=O) |
| 1400–1480cm$^{-2}$ | (B—O) |
| 830cm$^{-1}$ | (B...H—O) |

| B | % |
|---|---|
| (measured) 1.70% | (theoretical) 1.74% |

Further examples carried out by methods similar to those heretofore mentioned are summarized briefly in the following table:

|  |  |  | Character of the final product | | |
|---|---|---|---|---|---|
|  |  |  | IR absorption spectrum | B (percent) | |
| Ex. 19 | Method similar to 15 | Starting materials and final product |  | Found | Theoretical |

Ex. 19, Method similar to 15:

Starting materials:

$$\begin{array}{c} CH_2OH \\ CHOH \\ HOCH \\ CHOH \\ CHOH \\ CH_2OH \end{array}, \quad \begin{array}{c} CH_2OH \\ CHOH \\ CH_2OH \end{array}, \quad \begin{array}{c} OH \\ B-OH \\ OH \end{array}, \quad CH_2-CH_2 \text{ (O)}, \quad CH_3(CH_2)_6COOH$$

Final product:

$$H-(OCH_2CH_2-)_l-OCH \begin{array}{c} CH_2O-(CH_2CH_2O-)_j-OC(CH_2)_6CH_3 \\ CHO-(CH_2CH_2O-)_k-H \\ CHO \overset{\delta-}{\underset{\delta+H}{B}} \overset{OH}{\underset{OH}{C}} CH_2O-(CH_2CH_2O-)_n-OC(CH_2)_6CH_3 \\ CH_2O-(CH_2CH_2O-)_m-OC(CH_2)_6CH_3 \end{array}$$

j+k+l+m+n=40

IR absorption spectrum: 1,400 ~1,480 cm.$^{-1}$ (ν B—O)

B (percent): Found 0.44, Theoretical 0.45

---

|  |  |  | Character of the final product | | |
|---|---|---|---|---|---|
|  |  |  | IR absorption spectrum | B (percent) | |
| Ex. 20 | Method similar to 4 | Starting materials and final product |  | Found | Theoretical |

Ex. 20, Method similar to 4:

Starting materials:

$$\begin{array}{c} CH_2OH \\ CHOH \\ HOCH \\ CHOH \\ CHOH \\ CH_2OH \end{array}, \quad \begin{array}{c} HOHC-O \\ HOHC \quad CHCH_2OC \\ CHOH \end{array}, \quad \begin{array}{c} OH \\ B-OH \\ OH \end{array}, \quad CH_2-CH_2 \text{ (O)}, \quad CH_3(CH_2)_{10}COBr$$

Final product:

$$H-(OCH_2CH_2-)_k-OCH \begin{array}{c} CH_2O-(CH_2CH_2O-)_i-OC(CH_2)_{10}CH_3 \\ CHO-(CH_2CH_2O-)_j-H \\ CHO \overset{\delta-}{\underset{\delta+H}{B}} \overset{OHC}{\underset{OHC}{\phantom{B}}} \overset{CH_2}{\underset{O}{\phantom{B}}} \\ CHO \quad OHC \quad CHCH_2O-(CH_2CH_2O-)_m-OC(CH_2)_{10}CH_3 \\ CH_2O-(CH_2CH_2O-)_l-H \quad CHO-(CH_2CH_2O-)_n-H \end{array}$$

i+j+k+l+m+n=10

IR absorption spectrum: 1,740 cm.$^{-1}$ (νC=O); 1,400-1,480 cm.$^{-1}$ (ν B—C)

B (percent): Found 0.94, Theoretical 0.93

---

|  |  |  | Character of the final product | | |
|---|---|---|---|---|---|
|  |  |  | IR absorption spectrum | B (percent) | |
| Ex. 21 | Method similar to 14 | Starting materials and final product |  | Found | Theoretical |

Ex. 21, Method similar to 14:

Starting materials:

$$\begin{array}{c} CH_2 \\ HOHC-O \\ HOHC \quad CHCH_2OH \\ CHOH \end{array}, \quad B\begin{array}{c} OCH_3 \\ -OCH_3 \\ OCH_3 \end{array}, \quad \begin{array}{c} CH_2-OH \\ CH_2-OH \end{array}, \quad CH_2-CH_2 \text{ (O)},$$

$$CH_3(CH_2)_nCOOH \quad n\begin{cases} 26 & (17.3\%) \\ 28 & (35.1\%) \\ 30 & (32.8\%) \end{cases}$$

Final product:

$$\begin{array}{c} CH_2O \\ \phantom{CH_2O}\overset{\delta-}{B} \\ CH_2O \quad \overset{}{\underset{H}{\phantom{B}}} \overset{\delta+}{\phantom{B}} \end{array} \begin{array}{c} OHC \quad CH_2 \\ OHC \quad O \\ OHC \quad CHCH_2O-CH_2CH_2O-OC(CH_2)_n-CH_3 \\ CHOH \end{array}$$

$$n\begin{cases} 26 & (17.3\%) \\ 28 & (35.1\%) \\ 30 & (32.8\%) \end{cases}$$

IR absorption spectrum: 835 cm.$^{-1}$ (δB…H—O); 1,735 cm.$^{-1}$ (νC=O); 1,400-1,480 cm.$^{-1}$ (νB—O)

B (percent): Found 1.45, Theoretical 1.48

Example 22

Method similar to 2

Starting materials and final product

$$\begin{array}{c} CH_2 \\ HOHC \diagup \diagdown O \\ | \quad \quad CHCH_2OH \\ HOHC \diagdown \diagup \\ \quad CHOH \end{array}, \quad B \diagup\begin{array}{c}OC_2H_5\\OC_2H_5\\OC_2H_5\end{array}, \quad CH_2\!\!-\!\!CH_2 \diagdown O, \quad CH_3(CH_2)_6COOCH_3$$

$$CH_3-(CH_2)_6-CO-(OCH_2CH_2-)_k-OH_2CHC\begin{array}{c} \text{structure with B, CHO groups, and polyether chains:} \\ -(CH_2CH_2O-)_l-H \\ -(CH_2CH_2O-)_m-OC(CH_2)_6CH_3 \\ -(CH_2CH_2O-)_n-H \end{array}$$

$k+l+m+n=35$

Character of the final product

| IR absorption spectrum | B (percent) | |
|---|---|---|
| | Found | Theoretical |
| 1,745 cm.$^{-1}$ ($\nu$ C=O) | | |
| 1,400–1,480 cm.$^{-1}$ ($\nu$ B–O) | 0.48 | 0.49 |

Example 23

Method similar to 14

Starting materials and final product

$$\begin{array}{c} CH_2 \\ HOHC \diagup \diagdown O \\ | \quad \quad CHCH_2OH \\ HOHC \diagdown \diagup \\ \quad CHOH \end{array}, \quad B \diagup\begin{array}{c}OCH_3\\OCH_3\\OCH_3\end{array}, \quad CH_2\!\!-\!\!CH_2 \diagdown O, \quad CH_3(CH_2)_{20}COOH$$

$$CH_3(CH_2)_{20}-CO-(OCH_2CH_2-)_k-OC_2CHC\begin{array}{c} \text{structure with B, CHO groups, and polyether chains:} \\ -(CH_2CH_2O-)_l-H \\ -(CH_2CH_2O-)_m-H \\ -(CH_2CH_2O-)_n-H \end{array}$$

$k+l+m+n=8$

Character of the final product

| IR absorption spectrum | B (percent) | |
|---|---|---|
| | Found | Theoretical |
| 838 cm.$^{-1}$ ($\delta$ B···H–O) | | |
| 1,735 cm.$^{-1}$ ($\nu$ C=O) | | |
| 1,400–1,480 cm.$^{-1}$ ($\nu$ B–O) | 1.13 | 1.11 |

| Ex. 24 | Method similar to 15 | Starting materials and final product | Character of the final product |||
|---|---|---|---|---|---|
| | | | IR absorption spectrum | B (percent) Found | B (percent) Theoretical |
| | | $\begin{array}{c} CH_2OH \\ |  \\ CHOH \\ |  \\ HOCH \\ |  \\ CHOH \\ |  \\ CHOH \\ |  \\ CH_2OH \end{array}$, $B\begin{array}{c} OH \\ -OH \\ OH \end{array}$, $CH_2\!\!-\!\!CH_2$ (with O), $CH_3(CH_2)_6COOH$ | 835 cm.$^{-1}$ ($\delta B \ldots H\!-\!O$) | | |
| | | [structure: dimeric boron complex with $CH_3(CH_2)_6\text{-}CO\text{-}(OCH_2CH_2\text{-})_k\text{-}OH_2C$ and $CH_2O\text{-}(CH_2CH_2O\text{-})_m\text{-}OC(CH_2)_6CH_3$ chains; lower: $CH_3(CH_2)_6\text{-}CO\text{-}(OCH_2CH_2\text{-})_l\text{-}OH_2C$ and $CH_2O\text{-}(CH_2CH_2O\text{-})_n\text{-}H$; $k+l+m+n=5$] | 1,747 cm.$^{-1}$ ($\nu C\!=\!O$) 1,400–1,480 cm.$^{-1}$ ($\nu B\!-\!O$) | 2.08 | 2.20 |

| Ex. 25 | Method similar to 14 | Starting materials and final product | Character of the final product |||
|---|---|---|---|---|---|
| | | | IR absorption spectrum | B (percent) Found | B (percent) Theoretical |
| | | $\begin{array}{c} CH_2OH \\ CHOH \\ HOCH \\ CHOH \\ CHOH \\ CH_2OH \end{array}$, $B\begin{array}{c} OCH_3 \\ -OCH_3 \\ OCH_3 \end{array}$, $CH_2\!\!-\!\!CH_2$ (with O), $CH_3(CH_2)_{16}COOH$ | 835 cm.$^{-1}$ ($\delta B \ldots H\!-\!O$) | | |
| | | $CH_3(CH_2)_{16}CO\text{-}OCH_2CH_2OH_2C$ ... $CH_2OH$ [dimeric boron complex structure] | 1,735 cm.$^{-1}$ ($\nu C\!=\!O$) | 3.12 | 3.13 |

| Ex. 26 | Method similar to 15 | Starting materials and final product | Character of the final product |||
|---|---|---|---|---|---|
| | | | IR absorption spectrum | B (percent) Found | B (percent) Theoretical |
| | | $\begin{array}{c} CH_2OH \\ CHOH \\ HOCH \\ CHOH \\ CHOH \\ CH_2OH \end{array}$, $B\begin{array}{c} OH \\ -OH \\ OH \end{array}$, $CH_2\!\!-\!\!CH_2$ (with O), $CH_3(CH_2)_nCOOH$ $n\begin{cases}26\,(17.3\%)\\28\,(35.1\%)\\30\,(32.8\%)\end{cases}$ | | | |
| | | $CH_3(CH_2)_nCO\text{-}(OCH_2CH_2\!-\!)_kOH_2C$ ... $CH_2O\text{-}(OH_2CH_2O\!-\!)_m\text{-}OC(CH_2)_nCH_3$ [dimeric boron complex]; lower: $CH_3(CH_2)_nCO\text{-}(OCH_2CH_2\!-\!)_lOH_2C$ ... $CH_2O\text{-}(CH_2CH_2O\!-\!)_j\text{-}OC(CH_2)_nCH_3$; $j+k+l+m=40$ $n\begin{cases}26\,(17.3\%)\\28\,(35.1\%)\\30\,(32.8\%)\end{cases}$ | 1,735 cm.$^{-1}$ ($\nu C\!=\!O$) 1,400–1,480 cm.$^{-1}$ ($\nu B\!-\!O$) | 0.52 | 0.55 |

| Ex. 27 | Method similar to 15 | Starting materials and final product | Character of the final product |||
|---|---|---|---|---|---|
| | | | IR absorption spectrum | B (percent) Found | B (percent) Theoretical |
| | | CH₂OH—CHOH—HOCH—CHOH—CHOH—CH₂OH, CH₂OH—CHOH—CH₂OH, B(OH)₃, CH₂—CH₂(O), CH₃(CH₂)₆COOH | | | |
| | | [boron complex structure with CH₂O, OH₂C, CHO, OHC groups] CH₃(CH₂)₆CO—(OCH₂CH₂—)ₖ—OCH ... CH₂O—(CH₂CH₂O—)ₗ—OC(CH₂)₆CH₃ CHO—(CH₂CH₂O—)ₘ—OC(CH₂)₆CH₃ ... CH₂O—(CH₂CH₂O—)ₙ—OC(CH₂)₆CH₃ | 1,747 cm.⁻¹ (νC=O) 1,400–1,480 cm.⁻¹ (νB—O) | 0.81 | 0.82 |
| | | k+l+m+n=40 | | | |

| Ex. 28 | Method similar to 13 | Starting materials and final product | Character of the final product |||
|---|---|---|---|---|---|
| | | | IR absorption spectrum | B (percent) Found | B (percent) Theoretical |
| | | CH₂OH—CHOH—HOCH—CHOH—CHOH—CH₂OH, CH₂OH—CH₂OH, CH₂—CH₂(O), B(OCH₃)₃, CH₃(CH₂)₁₀COOCH₃ | 830 cm.⁻¹ (δB...H—O) | | |
| | | [boron complex structure] CH₃(CH₂)₁₀COO—CH₂CH₂—OCH ... CHO—CH₂CH₂OH ... | 1,740 cm.⁻¹ (νC=O) 1,400–1,480 cm.⁻¹ (νB—O) | 3.48 | 3.65 |

| Ex. 29 | Method similar to 13 | Starting materials and final product | Character of the final product |||
|---|---|---|---|---|---|
| | | | IR absorption spectrum | B (percent) Found | B (percent) Theoretical |
| | | CH₂OH—CHOH—HOCH—CHOH—CHOH—CH₂OH, HOHC—CH₂—O—CHCH₂OH—CHOH (furanose), CH₂OH—CH₂OH, CH₂—CH₂(O), B(OCH₃)₃, CH₃(CH₂)₁₆COCH | 835 cm.⁻¹ (δB...H-O) | | |
| | | [boron complex structure] CH₃(CH₂)₁₆CO—(OCH₂CH₂—)ₖ—OCH ... CHO—(CH₂O—)ₗ—H | 1735 cm.⁻¹ (δB...H-O) | 1.80 | 1.8 |

—Continued

| Ex. 29 | Method similar to 13 | Starting materials and final product | IR absorption spectrum | B (percent) Found | B (percent) Theoretical |
|---|---|---|---|---|---|
| | | 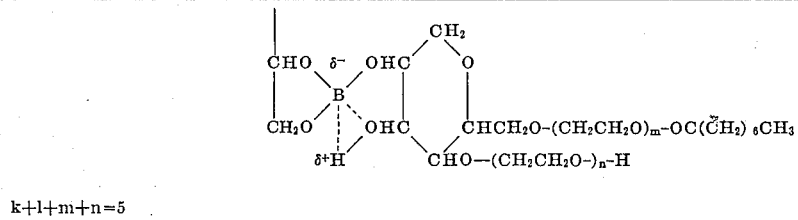 $k+l+m+n=5$ | 1,400–1,480 cm.$^{-1}$ ($\delta$B–O) | | |

| Ex. 30 | Method similar to 15 | Starting materials and final product | IR absorption spectrum | B (percent) Found | B (percent) Theoretical |
|---|---|---|---|---|---|
| | | 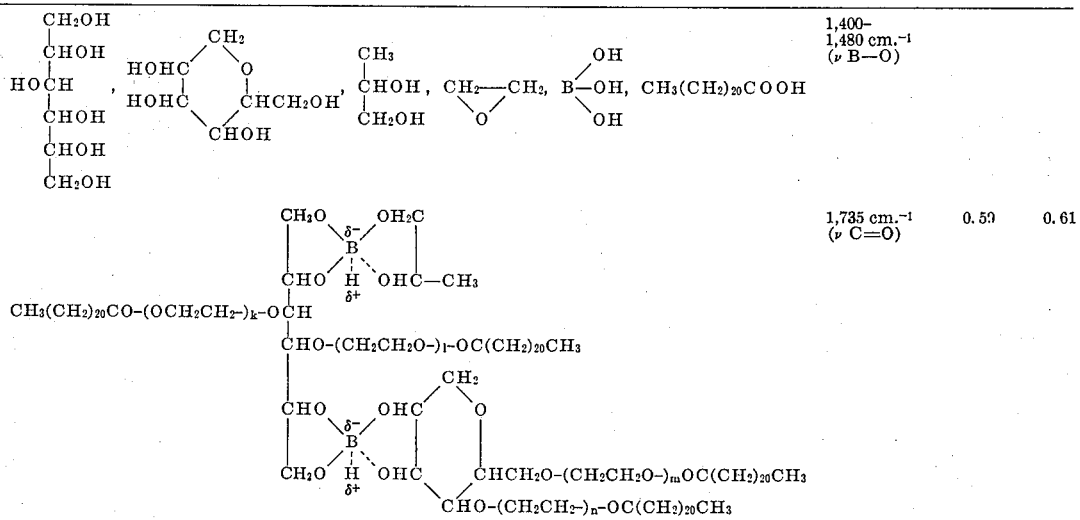 $k+l+m+n=40$ | 1,400–1,480 cm.$^{-1}$ ($\nu$ B–O) 1,735 cm.$^{-1}$ ($\nu$ C=O) | 0.59 | 0.61 |

| Ex. 31 | Method similar to 14 | Starting materials and final product | IR absorption spectrum | B (percent) Found | B (percent) Theoretical |
|---|---|---|---|---|---|
| | | 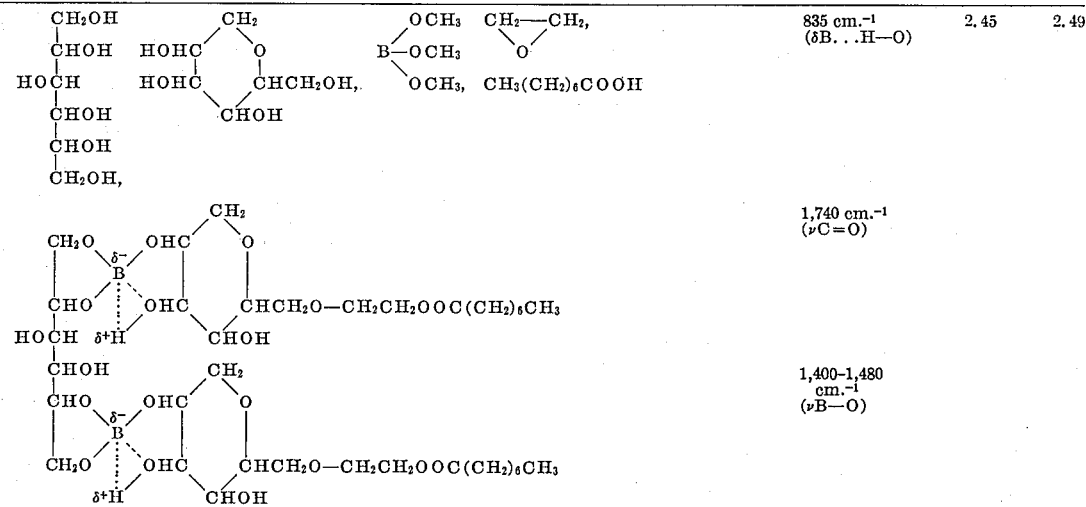 | 835 cm.$^{-1}$ ($\delta$B...H–O) 1,740 cm.$^{-1}$ ($\nu$C=O) 1,400–1,480 cm.$^{-1}$ ($\nu$B–O) | 2.45 | 2.49 |

| Ex. 32 | Method similar to 14 | Starting materials and final product | IR absorption spectrum | B (percent) Found | B (percent) Theoretical |
|---|---|---|---|---|---|
|  |  | CH₂OH−CHOH−HOCH−CHOH−CHOH−CH₂OH, HOHC−HOHC−CH₂−O−CHOH−CHCH₂OH, B(OCH₃)₃, CH₂−CH₂−O−OCH₃, CH₃(CH₂)₁₄COOH | | | |
|  |  | (boron-containing polyether ester structure shown) | 1,740 cm⁻¹ (νC=O) | 0.72 | 0.72 |
|  |  | H−(OCH₂CH₂−)ⱼ−OCH ... CHCH₂O−(CH₂CH₂O−)ᵢ−OC(CH₂)₁₄CH₃ CHO−(CH₂CH₂O−)ᵢ−H CHO−(CH₂CH₂O−)ₖ−OC(CH₂)₁₄CH₃ CHCH₂O−(CH₂CH₂O−)ₘ−OC(CH₂)₁₄CH₃ CHO−(CH₂CH₂O−)ₙ−OC(CH₂)₁₄CH₃ j+i+k+l+m+n=35 | 1,400–1,480 cm⁻¹ (νB−O) | | |

The products obtained according to the present invention, when used directly as non-ionic surface-active agents, or used after being rendered anionic by dislocation of the structure through addition of amine or alkali, or used in combination with other surface-active agents, exhibit excellent surface activity with unique features in various fields of application.

The following examples illustrate their performance, especially as an emulsifier or an anti-static agent for synthetic resins.

1. Examples of emulsification tests

A. 16g of stearic acid, 10 g of propylene glycol, 2 g of Span 60 and 6 g of the reaction product of Example 4 were introduced into a 200 cc beaker. The whole thing was heated to melt at 65°–70°C; and after being evenly mixed, 66 g of warm water at a temperature of 60°C was slowly added under agitation and then it was cooled. Th emulsified product thus obtained turned out to be a homogeneous, stable, creamy substance, thereby verifying the strong emulsifying power of the reaction product obtained in Example 4.

B. A comparison of washable cream emulsifying power under slightly alkaline conditions was made between the reaction product of Example 2 and Tween 20.

Emulsion Formulations (Formulation I)
| | |
|---|---|
| Palmitic acid | 10 g |
| Beeswax | 3 |
| Stearyl alcohol | 5 |
| Lanolin | 5 |
| Vaseline | 5 |
| Propylene glycol monostearate | 3 |
| Propylene glycol | 10 |
| Neutralizate of the product according to Example 2 with triethanol amine | 3 |
| Triethanolamine (alkaline) | 1 |
| Water | 35 |
| Total | 100 g |

Emulsion Formulations-Continued (Formulation II)
| | |
|---|---|
| Palmitic acid | 10 |
| Beeswax | 3 |
| Stearyl alcohol | 5 |
| Lanolin | 5 |
| Vaseline | 5 |
| Propylene glycol monostearate | 3 |
| Propylene glycol | 10 |
| Tween 20 | 3 |
| Triethanol amine (alkaline) | 1 |
| Water | 55 |
| Total | 100 g |

After one-year long stability tests of the two creams compounded by the above-mentioned formulations under a constant temperature of 20°C and a constant relative humidity of 65%, the cream compounded with the product according to Example 2 of the present invention (formulation I) remained stable for one year in the emulsified state, whereas the control cream emulsified by Tween 20 the fatty components became segregated in three months, thus verifying the excellent emulsifying power of the neutralizate of the product of Example 2 with triethanolamine.

C. The emulsification stability of a mixture of liquid paraffin and beeswax with sorbitan sesquioleate when prepared with the reaction product of Example 7 and with Tween 80 were compared. The formulations were as follows:

Emulsion formulations (Formulation I)
| | |
|---|---|
| Liquid paraffin | 25 |
| Sorbitan sesquioleate | 1.5 |
| Reaction product of Example 7 | 3.5 |
| Water | 70 |
| Total | 100 g |

Emulsion formulations — Continued (Formulation II)
| | | |
|---|---:|---|
| Liquid paraffin | 25 | g |
| Sorbitan sesquioleate | 1.5 | |
| Tween 80 | 3.5 | |
| Water | 70 | |
| Total | 100 | g |

(Formulation III)
| | | |
|---|---:|---|
| Beeswax | 30 | g |
| Sorbitan sesquioleate | 3.6 | |
| Reaction product of Example 7 | 14.4 | |
| Water | 82 | |
| Total | 130 | g |

(Formulation IV)
| | | |
|---|---:|---|
| Beeswax | 30 | g |
| Sorbitan sesquioleate | 3.6 | |
| Tween 80 | 14.4 | |
| Water | 82 | |
| Total | 130 | g |

Emulsification stability observations were made of these four formulations for 10 days in a 40°C constant temperature drying oven. On the second day, water separated out at the bottom of emulsions of formulations II and IV using Tween 80, while the emulsions of formulations I and III using the product of Example 7 according to the present invention remained stable with no water separated after 10 days.

D. The stability of methyl methacrylate monomer emulsification was compared between the following two formulations using respectively the reaction product of Example 5 according to the present invention and Poly(24)oxyethylene sorbitan monoisostearate.

(Formulation I)
| | | |
|---|---:|---|
| MMA monomer | 50 | g |
| Reaction product of Example 5 | 5 | |
| Water | 125 | |
| Total | 180 | g |

(Formulation II)
| | | |
|---|---:|---|
| MMA monomer | 50 | g |
| Poly(24)oxyethylene sorbitan monoisostearate | 5 | |
| Water | 125 | |
| Total | 180 | g |

The stability of the above two formulations was observed for one month under a constant temperature of 20°C and a constant humidity of 65%. The results showed that in the emulsion using poly(24)oxyethylene sorbitan monoisostearate under formulation II separated and MMA monomer separated on the second day, but the emulsion using the reaction product of Example 5 according to the present invention remained stable enough even after a full month.

2. Examples of tests for anti-static effect

A. Results of testing the effect of the reaction product of Example 8 as an anti-static agent for methyl methacrylate resin are cited here. As the control substance, a surfactant of phosphate type with the following structural formula was adopted:

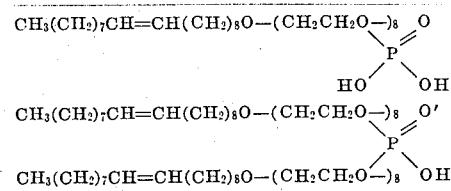

(Formulations)
| | | |
|---|---|---|
| I | MMA monomer | 100 parts |
| | Reaction product of Example 8 | 1,2,3 or 4 parts |
| II | MMA monomer | 100 parts |
| | Control with the above structure | 1,2,3 or 4 parts |

Manufacturing process:
Monomer-casting method —
| | |
|---|---|
| Polymerization | 90°C, 10 hours |
| Aging | 120°C, 2 hours |

Anti-static effect:

1. At 20°C, 65% RH, the surface resistivity was measured with the following results:

| Amount of addition | | Surface resistivity |
|---|---|---|
| Blank | | $3.61 \times 10^{16}$ Ω |
| Product of Example 8 | 1 part | $1.62 \times 10^{13}$ |
| do. | 2 part | $9.67 \times 10^{11}$ |
| do. | 3 part | $8.92 \times 10^{10}$ |
| do. | 4 part | $1.08 \times 10^{10}$ |
| Control substance | 1 part | $3.61 \times 10^{15}$ |
| do. | 2 part | $4.30 \times 10^{14}$ |
| do. | 3 part | $1.85 \times 10^{14}$ |
| do. | 4 part | $4.28 \times 10^{12}$ |

2. At 20°C, 65 % RH, the charge extinctive characteristic under an impressed voltage of 5000 V was measured with the following results:

| Amount of addition | | Saturated charge | Period of half decay |
|---|---|---|---|
| Blank | | 2500 V | — |
| Product of Example 8 | 1 part | 1200 | 16 sec |
| do. | 2 part | 1000 | 6 |
| do. | 3 part | 900 | 2.3 |
| do. | 4 part | 650 | 1.3 |
| Control substance | 1 part | 2000 | 23 |
| do. | 2 part | 1500 | 19 |
| do. | 3 part | 1200 | 13 |
| do. | 4 part | 850 | 4.5 |

The above results testify to the superiority of the product of Example 8 to the surfactant of phosphate type in the anti-static effect for MMA resins.

B. Comparison between the reaction product of Example 1 and a conventional anti-static agent.
The anti-static effect for hardened vinyl chloride resin was compared with Catanao SN of the following structure:

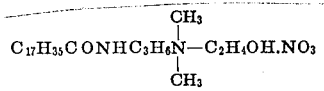

The results are as follows:

| Formulations | (1) | (2) | |
|---|---|---|---|
| Vinyl chloride resin | 100 | 100 | parts |
| Tributyl tin laurate | 1 | 1 | parts |
| Catanao SN | 1 | 0.7 | parts |
| Reaction product of Example 1 | — | 0.3 | parts |

Manufacturing process:
Extrusion method      140°C, 5 minutes
Heat stability test:
Tests were made in a Geer's oven at 170°C

| Specimen | Test duration | | | | | |
|---|---|---|---|---|---|---|
| | 20 min | 40 min | 60 min | 80 min | 100 min | 120 min |
| Blank | color-less | color-less | color-less | color-less | light yellow | light yellow |
| Formulation (1) | light yellow | light yellow | dark brown | black | black | black |
| do. (2) | color-less | light yellow | black light yellow | brown | red | black |

Anti-Static effect:
At 20°C, 55 % RH the charge extinctive characteristic under impressed voltage of 5,000 V was measured with the following results:

| Specimen | Surface resistivity | Saturated charge | Period of half decay |
|---|---|---|---|
| Blank | $6.68 \times 10^{16} \Omega$ | 2000 V | — |
| Formulation (1) | $8.82 \times 10^{12}$ | 550 | 6 sec |
| do. (2) | $1.28 \times 10^{12}$ | 400 | 2.9 |

As seen from the above results, the compound according to the present invention, when combined in use with an anti-static agent of cation type, can improve not only the anti-static effect but also the heat stability.

C. Comparison between the reaction product of Example 14 and Tween 60 for anti-static effect on soft vinylchloride resin.
The results are as follows:

Formulations (Formulation 1)
Vinyl chloride resin         100    parts
DOP (dioctyl phthalate)       40    parts
Cadmium stearate soap         0.5   part
Barium stearate soap          0.5   part
Reaction product of Example 14  1   part (Formulation II)
Vinyl chloride resin         100    parts
DOP (dioctyl phthalate)       40    parts
Cadmium stearate soap         0.5   part
Barium stearate soap          0.5   part
Tween 60                      1     part Milling condition:
Roll temperature             170   ±5°C
Killing time                   5    min Anti-static effect:
At 20°C, 65 % RH, the surface resistivity and frictional charge were measured with the following results:

| Specimen | Surface resistivity | Frictional charge |
|---|---|---|
| Blank | $2.36 \times 10^{15} \Omega$ | 2000 V |
| Molded product of formulation I | $2.30 \times 10^{12}$ | 250 |
| do. II | $5.20 \times 10^{13}$ | 370 |

The above results testify to the superiority of the compound according to the present invention to a conventional non-ionic surfactant of the ester of sorbitan type in its anti-static effect on soft vinyl chloride resin.

D. Comparison between the reaction product of Example 18 and glyceryl monopalmitate in the anti-static effect on polyethylene film.

The results are as follows

Molding conditions:                                  parts
Formulation I)    { Polyethylene resin              100
                  { Reaction product of Example 18   0.5
(Formulation II)  { Polyethylene resin              100
                  { Glyceryl monopalmitate           0.5

Extrusion method:
Using dies at 210°C
Anti-static effect:
At 20°C, 65 % RH, the surface resistivity and frictional charge were measured with the following results (the value for blank polyethylene resin is $6.82 \times 10^{17} \Omega$):

1. Immediately after molding

| Specimen | Surface resistivity | Frictional charge |
|---|---|---|
| Molded film of formulation I | $2.88 \times 10^{11} \Omega$ | 180 V |
| do. II | $5.35 \times 10^{12}$ | 250 |

2. After two months

| Specimen | Surface resistivity | Frictional charge |
|---|---|---|
| Molded film of formulation I | $3.32 \times 10^{10} \Omega$ | 80 V |
| do. II | $1.87 \times 10^{11}$ | 130 |

3. As adjusted to the condition of 20°C, 65 % RH for 24 hours after one hour of washing with water

| Specimen Specimen | Surface resistivity | Frictional charge |
|---|---|---|
| Molded film of formulation I | $3.55 \times 10^{23} \Omega$ | 200 V |
| do. II | $8.67 \times 10^{15}$ | 2700 |

From the above results, it is clear that the compound according to the present invention, which possesses excellent compatibility with a highly hydrophobic polyethylene resin, can give a stable anti-static effect.

Next, comparison in the decrease in surface tension, foaming power and wetting power was made between the surface-active organoboron compounds cited in the examples of this invention and the conventional non-ionic surfactants, i.e., polyoxyethylene glycol fatty monoesters and a series of Tween surfactants.

Measured data

| Specimen | | Surface tension (0.1%) at 20 °C (dyne/cm) | Foaming Power (0.25%) at 40 °C | | Wetting Power (0.1%) at 25 °C Time (sec.) |
|---|---|---|---|---|---|
| | | | Just after addition (mm) | 5 min later (mm) | |
| Reaction product of Example— | 1 | 28.56 | 8 | 6 | 300 or more |
| Do | 2 | 30.16 | 145 | 130 | 11.7 |
| Do | 3 | 32.76 | 70 | 60 | 71.6 |
| Do | 4 | 32.95 | 60 | 50 | 105.6 |
| Do | 5 | 32.95 | 70 | 65 | 72.0 |
| Do | 6 | 30.52 | 20 | 15 | 114.7 |
| Do | 7 | 32.15 | 75 | 55 | 30.0 |
| Do | 8 | 32.15 | 65 | 55 | 27.5 |
| Do | 9 | 29.18 | 160 | 145 | 300 or more |
| Do | 10 | 29.18 | 145 | 120 | 10.5 |
| Do | 11 | 34.13 | 65 | 50 | 50.0 |
| Do | 12 | 32.05 | 160 | 135 | 103.7 |
| Do | 13 | 32.50 | 70 | 55 | 35.0 |
| Do | 14 | 34.05 | 20 | 10 | 120.0 |
| Do | 15 | 33.40 | 45 | 35 | 300 or more |
| Do | 16 | 36.80 | 30 | 10 | 300 or more |
| Do | 17 | 35.05 | 0 | 0 | — (immeasurable) |
| Do | 18 | 30.10 | 10 | 5 | 300 or more |
| Do | 19 | 34.05 | 45 | 40 | 300 or more |
| Do | 20 | 30.10 | 60 | 40 | 112.4 |
| Do | 21 | 36.56 | 0 | 0 | — (immeasurable) |
| Do | 22 | 33.85 | 70 | 60 | 300 or more |
| Do | 23 | 34.20 | 75 | 45 | 286.0 |
| Do | 24 | 30.85 | 5 | 0 | 300 or more |
| Do | 25 | 32.33 | 15 | 10 | 300 or more |
| Do | 26 | 34.26 | 20 | 10 | 300 or more |
| Do | 27 | 34.55 | 30 | 25 | 192.3 |
| Do | 28 | 33.27 | 0 | 0 | — (immeasurable) |
| Do | 29 | 32.90 | 5 | 0 | 300 or more |
| Do | 30 | 35.05 | 35 | 15 | 300 or more |
| Do | 31 | 29.60 | 10 | 10 | 300 or more |
| Do | 32 | 31.25 | 35 | 25 | 262.7 |

| Specimen | Surface tension (0.1%) at 20 °C (dyne/cm) | Foaming Power (0.25%) at 40 °C | | Wetting Power (0.1%) at 25 °C Time (sec.) |
|---|---|---|---|---|
| | | Just after addition (mm) | 5 min later (mm) | |
| PEG (16) monolaurate | 29.89 | 93 | 40 | 6.8 |
| PEG (20) monolaurate | 35.94 | 80 | 65 | 28.5 |
| PEG (24) monostearate | 35.58 | 0 | 0 | 90.0 |
| PEG (24) monooleate | 33.13 | 15 | 6 | 36.0 |
| Tween 20 | 31.33 | 105 | 90 | 12.5 |
| Tween 40 | 35.49 | 15 | 5 | 78.9 |
| Tween 60 | 35.49 | 10 | 0 | 106.7 |
| Tween 80 | 36.00 | 80 | 65 | 78.3 |

The surface tension was measured by a Du Nouy tensiometer under constant temperature and constant pressure of 20°C, 65% RH.

The foaming power was tested by the Rossmiles Test method. The wetting power was measured by a forced settling method at 25 °C using a canvas disk.

The above data prove that the organoboron compounds of the present invention are a sufficiently effective surfactant. Meanwhile, their excellent heat stability can be testified by the following test data.

Heat stability test data (heated at 180°C)

| Specimen | Test item | Treat time Before treated | 20 min | 40 min | 60 min |
|---|---|---|---|---|---|
| Reaction product of Example 4 | Color tone (Gardner) | No 4 | No 4 | No 4 | No 5 |
| | Weight loss | 0 % | 0.080% | 0.082% | 0.086% |
| Reaction product of Example 7 | Color tone (Gardner) | No 6 | No 6 | No 7 | No 8 |
| | Weight loss | 0 % | 0.080% | 0.086% | 0.087% |
| Tween 60 | Color tone (Gardner) | No 4 | No 8 | No 10 | No 11 |
| | Weight loss | 0 % | 1.05% | 1.10% | 1.23% |
| Tween 80 | Color tone (Gardner) | No 6 | No 7 | No 7 | No 8 |
| | Weight loss | 0 % | 1.82% | 2.05% | 2.21% |
| | | 80 min | 100 min | 120 min | |

| Specimen | Test item | Treat time Before treated | 20 min | 40 min | 60 min |
|---|---|---|---|---|---|
| Reaction product of Example 4 | Color tone (Gardner) | No 5 | No 5 | No 5 | |
| | Weight loss | 0.088% | 0.102% | 0.13% | |
| Reaction product of Example 7 | Color tone (Gardner) | No 8 | No 8 | No 8 | |
| | Weight loss | 0.088% | 0.107% | 0.160% | |
| Tween 60 | Color tone (Gardner) | No 12 | No 14 | No 14 | |
| | Weight loss | 1.79% | 2.07% | 2.15% | |
| Tween 80 | Color tone (Gardner) | No 9 | No 9 | No 10 | |
| | Weight loss | 2.29% | 2.42% | 2.53% | |

For testing, 100 g of specimen was taken in a 200 CC beaker; heated to 180°C (in air); and then observed for color change and weight loss.

What is claimed is:

1. Surface-active organoboron compounds having the following structural formula:

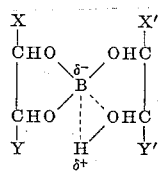

wherein X, X', Y, Y' are H, CH$_3$, C$_2$H$_5$ or

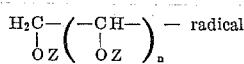

in which n is 0, 1, 2 or 3, Z is H or H—(OCH$_2$CH$_2$—)j— or RCO—(OHC$_2$CH$_2$—)k— radical wherein R is an alkyl group with 7 to 31 carbon atoms and the total of k+j is in a range of 1–40 and at least one of X, X', Y, Y' is

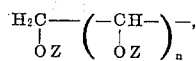

which group contains at least one — radical, where Z is RCO—(OCH$_2$CH$_2$—)$_k$—.

2. Surface-active organoboron compounds having the following structural formula:

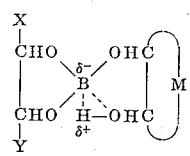

wherein X, Y are H, CH$_3$, C$_2$H$_5$ radical or

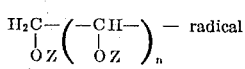

in which n is 0, 1, 2 or 3; Z is H or H—(OCH$_2$CH$_2$—)j— or RCO—(OCH$_2$CH$_2$—)k— radical wherein R is an alkyl group with 7 to 31 carbon atoms and total of k+j is in a range of 1–40, or M is

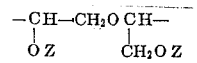

radical in which Z is H or H—(OCH$_2$CH$_2$—)j— or RCO—(OCH$_2$CH$_2$—)k— radical wherein R is an alkyl group with 7 to 31 carbon atoms and total of k+j is in a range of 1–40, or M is

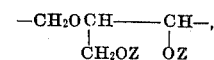

radical and at least one of X, Y, M is an

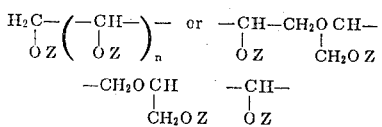

contains at least one—OZ radical, provided that Z is RCO—(OCH$_2$CH$_2$—)k— radical.

3. Surface-active organoboron compounds having the following structural formula:

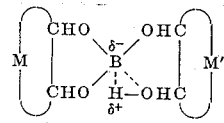

wherein M, M' are

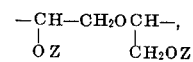

radical in which Z is H or H—(OCH$_2$CH$_2$—)j— or RCO—(OCH$_2$CH$_2$—)k— radical wherein R is an alkyl group with 7 to 31 carbon atoms and the total of k+j is in a range of 1–40, or M, M' are

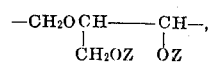

radical, and at least one of M, M' is

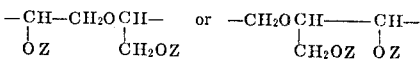

which contains at least one —OZ radical, where Z is RCO—(OCH$_2$CH$_2$—)k—.

4. Surface-active organoboron compounds having the following structural formula:

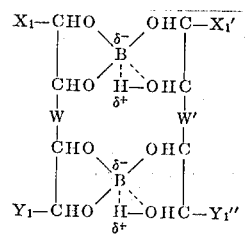

wherein W, W' are

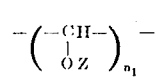

radical in which $n_1 = 0$, 1 or 2 and Z is H or H—(OCH$_2$CH$_2$—)j— or RCO—(OCH$_2$CH$_2$—)k— radical where R is an alkyl group with 7 to 31 carbon atoms and the total of k+j is in a range of 1–40, X$_1$, X'$_1$, Y$_1$, Y''$_1$ are H or

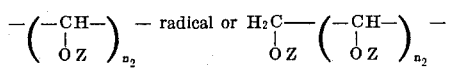

in which $n_2$ is 0 or 1, and at least one of W, W', X, X', Y$_1$, Y$_1$'' is

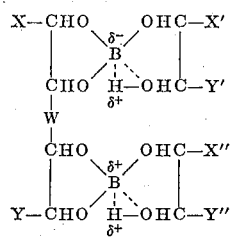

radical which contains at least one —OZ radical, where Z is RCO—(OCH$_2$CH$_2$—)$_k$—.

5. Surface-active organoboron compounds having the following structural formula:

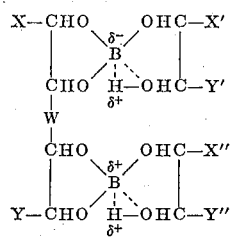

wherein W is

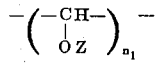

radical in which $n_1$ is 0, 1 or 2, Z is H or H—(OCH$_2$CH$_2$—)j— or RCO—(OCH$_2$CH$_2$—)k— radical where R is an alkyl group with 7 to 31 carbon atoms and the total of k+j is in a range of 1–40, X, Y are H or

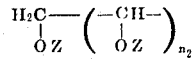

radical in which $n_2$ is 0 or 1, X', X'', Y', Y'' are H, CH$_3$, C$_2$H$_5$ or

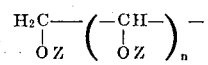

radical in which n is 0, 1, 2 or 3, and at least one of W, X, X', X'', Y, Y', Y'' is

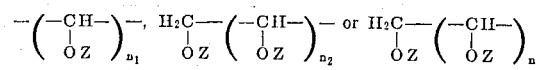

which contains at least one —OZ radical, where Z is RCO—(OCH$_2$CH$_2$—)k—.

6. Surface-active organoboron compounds having the following structural formula:

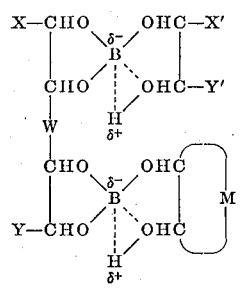

wherein W is

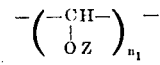

radical in which n is 0, 1 or 2, Z is H or H—(OCH$_2$CH$_2$—)j— or RCO—(OCH$_2$CH$_2$—)k— radical wherein R is an alkyl group with 7 to 31 carbon atoms and the total of k+j is in a range of 1–40, X, Y are H or

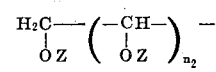

radical in which $n_2$ is 0 or 1, X', Y' are H, CH$_3$, C$_2$H$_5$ or

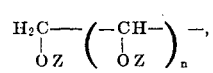

radical in which n is 0, 1, 2 or 3, M is

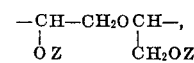

radical, or M is

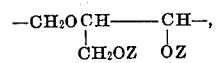

radical, and at least one of W, X, X', Y, Y', M is

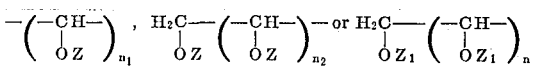

or

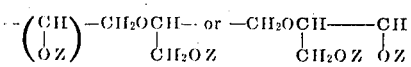

which contains at least one —OZ radical, provided that Z is RCO—(OCH$_2$CH$_2$—)k— radical.

7. Surface-active organoboron compounds having the following structural formula

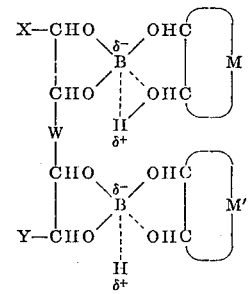

wherein W is

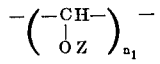

radical in which $n_1$ is 0, 1 or 2, Z is H or H—(OCH$_2$CH$_2$—)j— or RCO—(OCH$_2$CH$_2$—)k— radical wherein R is an alkyl group with 7 to 31 carbon atoms and the total of k+j is in a range of 1–40, X, Y are H or

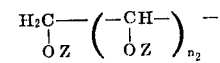

radical in which $n_2$ is 0 or 1, M, M' are

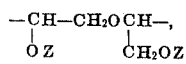

radical in which Z is H or $H-(OCH_2CH_2-)_j-$ or $RCO-(OCH_2CH_2-)_k-$ radical wherein R is an alkyl group with 7 to 31 carbon atoms and the total of k+j is in a range of 1–40, or M, M' are

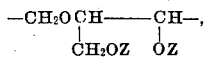

and at least one of W, X, Y, M, M' is

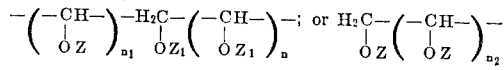

or 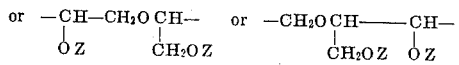

which contains at least one —OZ radical, where Z is $RCO-(OCH_2Ch_2-)_k-$.

8. Surface-active organoboron compound of claim 1, which is [γ-lauroylpoly oxyethylene glyceryl-α, β, γ'-poly oxyethylene glyceryl-α', β'] boronium hydride having a total of 1–40 oxyethylene groups.

9. Surface-active organoboron compound of claim 1, which is [γ-palmitoylpoly oxyethylene glyceryl-α, β, γ'-poly oxyethylene glyceryl-α', β'] boronium hydride having a total of 1–40 oxyethylene groups.

10. Surface-active organoboron compound of claim 1, which is [γ-stearoylpoly oxyethylene glyceryl-α, β, γ'-poly oxyethylene glyceryl-α', β'—] boronium hydride having a total of 1–40 oxyethylene groups.

11. Surface-active organoboron compound of claim 1, which is [α-oleoylpoly oxyethylene glyceryl-α, β, γ'-poly oxyethylene glyceryl-α', β'—] boronium hydride having a total of 1–40 oxyethylene groups.

12. Surface-active organoboron compound of claim 1, which is bis [α-lauroylpoly oxyethylene glyceryl-α, β—] boronium hydride having a total of 1–40 oxyethylene groups.

13. Surface-active organoboron compound of claim 1, which is bis [α-linoleoylpoly oxyethylene glyceryl-α, β—] boronium hydride having a total of 1–40 oxyethylene groups.

14. Surface-active organoboron compound of claim 1, which is bis [α-stearoylpoly oxyethylene glyceryl-α, β—] boronium hydride having a total of 1–40 oxyethylene groups.

15. A process for production of the surface-active organoboron compounds, comprising first reacting one mol of boric acid or triesterborate of monohydric lower alcohol with two mols of polyhydric alcohol having vicinal hydroxyl radicals in such a manner that the total number of hydroxyl radicals, in the molecules of said polyhydric alcohol is 5 or more per boron atom in the molecule of boric acid or per boron atom in the molecule of lower alcohol triborate thereby producing a triester borate of said polyhydric alcohol; then adding 1–40 mols ethylene oxide for attachment to one mol of thus obtained triesterborate of said polyhydric alcohol retaining at least one free hydroxyl radical besides the hydroxyl radical forming semi-polar bond in the presence of non-protonic Lewis acid catalyst in such a manner that the average degree of polymerization of the polyoxyethylene radical in the molecule of the end product is 1–40; and then reacting at least one of the terminal hydroxyl radicals of the derived triester borate with a carboxylic acid having alkyl groups having 7 to 31 carbon atoms or a lower alcohol ester of said carboxylic acid or an acylhalide of said carboxylic acid.

16. The process for the production of the surface-active organoboron compounds of claim 15, whereby 24 mols of ethylene oxide is subjected to the addition reaction using 3% by weight boron trifluoride as said catalyst, to one mol of a triester borate obtained from one mol of boric acid and two mols of glycerine; and then a carboxylic acid ester is derived through reaction with one to two mol of lauric acid, stearic acid, oleic acid or linoleic acid.

17. The process for production of the surface-active organoboron compounds in claim 15 whereby 24 mols of ethylene oxide is subjected to the addition reaction using 3% by weight boron trifluoride as catalyst, to one mol of a triester borate obtained from one mol of boric acid and two mols of glycerine; and then a carboxylic acid ester is derived through reaction with one mol of palmitic acid chloride or stearic acid chloride.

* * * * *